(No Model.) 2 Sheets—Sheet 1.
P. FLUCKS & G. P. McDONNELL.
BICYCLE BELL.
No. 572,881. Patented Dec. 8, 1896.
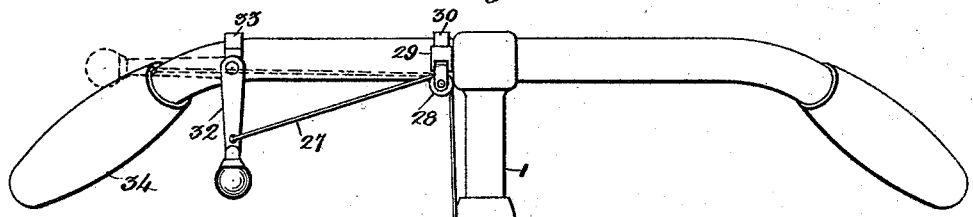
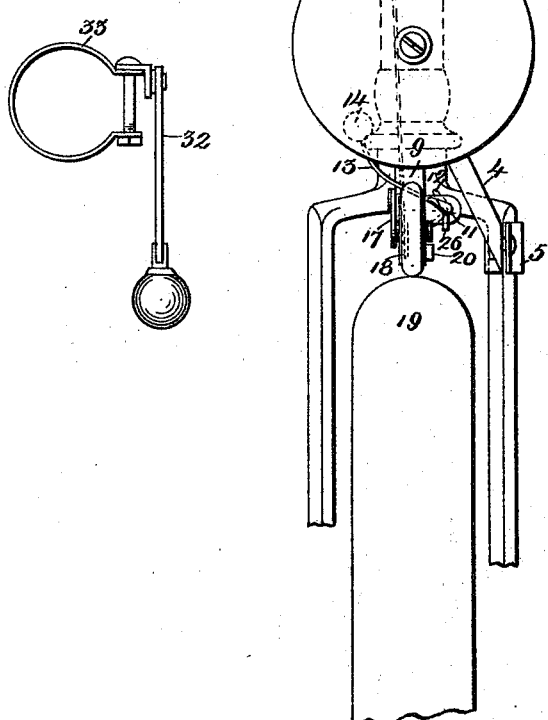
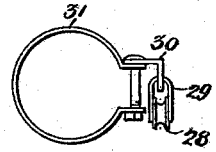
Witnesses
Inventors
Paul Flucks, and
George P. McDonnell
By their Attorneys (No Model.) 2 Sheets—Sheet 2.
P. FLUCKS & G. P. McDONNELL.
BICYCLE BELL.
No. 572,881. Patented Dec. 8, 1896.
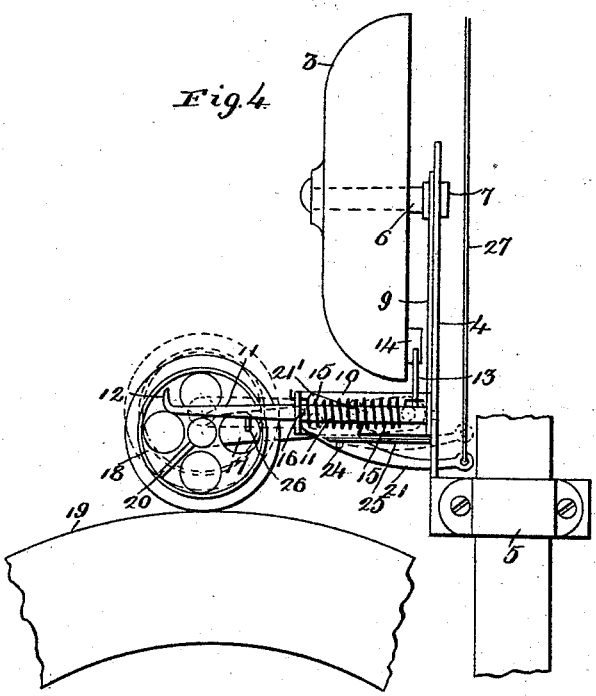
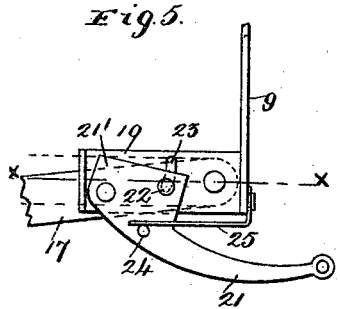
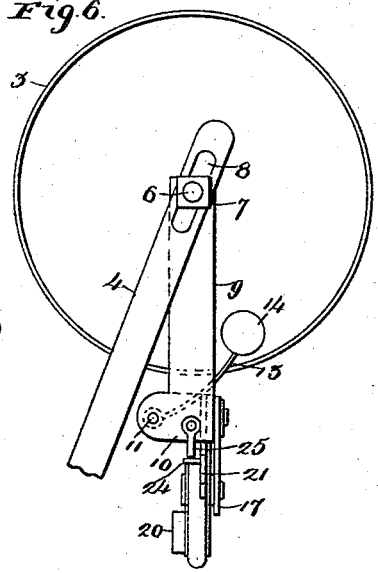
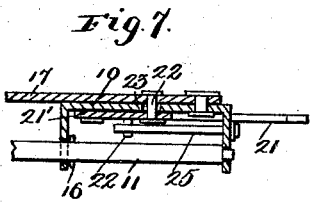
Witnesses
Inventors
Paul Flucks and
George P. McDonnell
By their Attorneys

UNITED STATES PATENT OFFICE.

PAUL FLUCKS AND GEORGE P. McDONNELL, OF ST. LOUIS, MISSOURI.

BICYCLE-BELL.

SPECIFICATION forming part of Letters Patent No. 572,881, dated December 8, 1896.

Application filed July 28, 1896. Serial No. 600,784. (No model.)

*To all whom it may concern:*

Be it known that we, PAUL FLUCKS, a subject of the Emperor of Germany, and GEORGE P. McDONNELL, a citizen of the United States, both residing at St. Louis, in the State of Missouri, have invented certain new and useful Improvements in Bicycle Alarm-Bells, of which the following is a full, clear, and exact description, reference being had to the accompanying drawings, forming a part hereof.

Our invention has relation to improvements in bicycle alarm-bells; and it consists in the novel arrangement and combination of parts more fully set forth in the specification and pointed out in the claims.

In the drawings, Figure 1 is a front elevation of the upper portion of a bicycle having our invention applied thereto. Fig. 2 is a detail of the clasp or band from which the controlling-arm is swung. Fig. 3 is a detail of the clasp or band from which the grooved roller over which the operating-cord passes is suspended. Fig. 4 is a side elevation of the parts shown in Fig. 1. Fig. 5 is a detail in side elevation of the spring-controlled lever by which the roller-carrying arm is operated. Fig. 6 is a rear view of the bell and parts cooperating therewith, and Fig. 7 is a section on line $x\ x$ of Fig. 5.

The object of our invention is to construct an alarm-bell which may be made to respond at a moment's notice to the will of the rider while the wheel is in motion, the bell being under his perfect control and the parts being so constructed that the alarm can be readily discontinued when occasion for its sounding does not arise.

The present device is operated from the tire of the front wheel and in detail may be described as follows:

Referring to the drawings, 1 represents the steering-rod of the bicycle, which passes through the front post 2, the lower forked end of said rod carrying the front wheel—a construction well known and requiring no detail description. The manner of securing the bell 3 and the parts coöperating therewith to the forked lower end of the steering-rod is by means of an arm 4, the lower end of which terminates in a loop 5, adapted to be clamped to one of the members of the fork. The upper end of the arm 4 is passed over the screw-threaded end of the stem 6, by which the bell is directly carried, a terminal nut 7 serving to secure the parts, and a slot 8 being formed at the upper end of the arm 4, whereby any desirable adjustment in the securing of the parts is possible. Also secured to the screw-threaded end of the stem 6 is a bar 9, projecting a suitable distance beyond the edge of the bell, the said projecting end of the bar having secured thereto a U-shaped plate 10, projecting forwardly of the bell, the arms of the said plate being turned laterally or toward the arm 4 and substantially at right angles to the said bar 9. Through suitable alining openings in the arms of the U-shaped plate is passed a rocking stem 11, projecting forwardly a suitable distance beyond the outer arm, the free end of the stem being provided with a right-angular deflected portion 12. To the base of the stem is secured the hammer 13, the terminal or enlarged portion 14 of which is held normally in contact with the inner surface of the bell by the resilient action of the torsional spring 15, encircling the stem, and whose one end is passed around the base of the hammer-lever (see Fig. 4) and the opposite end passed through the outer arm of the U-shaped plate. A pin 16 serves to retain the rocker-stem in place.

Pivoted at one end along the U-shaped plate along the outer surface thereof (or that surface opposite to the direction in which the arms of the plate are turned) is a vertically-swinging arm 17, projecting forwardly a suitable distance beyond the outer end of the plate, the free end of the said vertically-swinging arm carrying a roller 18, which is adapted to normally engage with the tire 19 of the front wheel of the bicycle. Carried by the side of the roller 18 and radially disposed along the same is a lug 20, which, during the rotation of the roller as the latter is driven by contact with the revolving tire, is adapted to ride over the deflected end 12 of the rocker-stem and rock the latter with each contact with said deflected end against the tension of the torsional spring 15, thus rocking the stem 11 and swinging the hammer out of contact with the bell, the stem and hammer carried thereby being rocked back to the normal position by the torsional spring 15 after the lug 20 in its rotation has passed beyond the reach of or out of contact with the deflected end 12, whereby, as the hammer thus returns to its normal position in contact with the bell, an alarm will be sounded. An alarm will thus be sounded with every revolution of the roller 18, that is, every time that the torsional spring returns the hammer to its normal position after the action of the lug 20 on the deflected end 12 of the stem has ceased.

It was stated that the roller 18 is normally in contact with the tire 19. This contact is effected by the following mechanism: Pivoted along the inner surface of the U-shaped plate adjacent to the outer arm thereof is a spring-controlled lever 21, whose inner end 21', or that adjacent to the pivotal point thereof, is expanded, the base of said expanded portion being provided with an outwardly-projecting pin 22, which operates in a curved slot 23, cut in the U-shaped plate, the outer end of said pin being secured directly to the roller-carrying arm 17 at a point intermediate the pivotal point of the latter and the roller carried thereby. Projecting inwardly from the expanded end 21' of the lever 21 is a second pin 24, against which bears downwardly the free end of an elastic spring or plate 25, whose opposite end is secured to the rear of the base of the bar 9. The action of the spring-plate 25 is such that as it bears down on the pin 24, carried by the lever 21, it bears down on said lever, whereby the latter by its connection with the arm 17, through the medium of the pin 22, passing through the slot 23, pulls down the free end of the said arm 17, causing the roller 18 thereof to bear against the rotating tire as the wheel advances. Should the rocker-stem 11 stick for any reason after being once tripped or rocked by the lug 20 and thus fail to return to its normal position under the action of the torsional spring 15, we provide the stem with a projecting arm 26, which the lug 20 in its rotation can strike, and thus assist the spring 15 in its work of restoring the parts in the manner indicated.

If the free end of the lever 21 is drawn upward, as indicated by the dotted position in Fig. 4, the free end of the roller-carrying arm 17 will be correspondingly raised sufficiently to disengage the roller 18 from the tire, in which event no alarm will be sounded. The disengagement of the parts is accomplished as follows: Leading from the free end of the lever 21 is a cord 27, which passes over a grooved roller 28, mounted between the ends of a yoke 29, which swings from an arm 30, carried by a band 31, which is clamped to the handle-bar near its juncture with the steering-rod 1. The cord is continued and its opposite end is secured to the free end of an operating-arm 32, pivoted to or suspended from a loop or band 33, clamped to the handle-bar adjacent to one of the handles 34 thereof. It is apparent that as the rider (with his thumb or any other portion of the hand) swings the operating-arm to the dotted position indicated in Fig. 1 the spring-controlled lever 21 is tilted to the dotted position shown in Fig. 4, thus disengaging the roller 18 from the tire. Upon release of the parts the spring-plate 25 will restore the same to their normal position, again bringing the roller 18 into contact with the tire of the wheel, and when the latter is in motion an alarm will be sounded with each revolution of the roller 18. It is apparent that whatever unevenness there may be in the tire a positive engagement between the roller 18 and the tire is always insured by the action of the spring-plate 25.

The device may be modified in some of its details without departing from the spirit of our invention.

Having described our invention, what we claim is—

1. In a bicycle alarm-bell, a suitable bell, means for securing the same to the frame of the machine, a swinging arm carrying at its free end a roller adapted to normally contact with the tire of the wheel, a plate to which said arm is pivoted, a rocking stem carried by said plate, a hammer carried by the stem, a spring for normally pressing the hammer against the bell, a deflected end forming a part of the stem, a lug carried by the side of the contact-roller adapted to intermittently ride over the deflected end of the stem and rock the same and trip the hammer carried thereby against the tension of the spring controlling the hammer, the said spring restoring the parts to their normal position and bringing the free end of the hammer in contact with the bell and thus sounding an alarm during the motion of the wheel, substantially as set forth.

2. In a bicycle alarm-bell, a suitable bell, means for securing the same to the frame of the machine, a swinging arm carrying at its free end a roller adapted to normally contact with the tire of the wheel, a U-shaped plate to which said arm is pivoted, a rocking stem passed through the arms of the plate, a hammer carried at one end of the stem, a torsional spring encircling the stem and having one end bearing against the base of the hammer and the opposite end secured to the outer arm of the plate, the said stem projecting a suitable distance beyond the U-shaped plate and having a deflected end, a lug carried by the side of the contact-roller adapted to intermittently ride over the deflected end of the stem and rock the same and trip the hammer carried thereby against the tension of the torsional spring, the said spring restoring the parts to their normal position and bringing the free end of the hammer in contact with the bell and thus sound an alarm during the motion of the wheel, substantially as set forth.

3. In a bicycle alarm-bell, a suitable bar depending from the stem of the bell, a roller-carrying arm, a U-shaped plate secured to or forming a continuation of the bar, to which the roller-carrying arm is pivoted, a lever pivoted to said plate, an inwardly-projecting pin carried by the lever near the pivotal point of the same, a spring-plate having one end secured to the base of the bar and having its free end bearing down on the pin projecting from said lever whereby the latter is kept in a depressed position, a slot formed in the U-shaped plate, a pin passed through said slot and effecting a connection between the spring-controlled lever and the roller-carrying arm, whereby with the depressed position of the lever the roller carried by the arm is kept in contact with the tire of the wheel, and means under the control of the rider for tilting the lever against the action of the spring-plate and thus disengaging the roller from contact with the tire, substantially as set forth.

4. In a bicycle alarm-bell, a suitable arm having a slotted upper end, adapted to be respectively secured to the forked end of the steering-rod and the stem of the bell, a bar adapted to be also secured to the stem of the bell, whereby accurate adjustment in the position of said arm and bar may be effected, a roller-carrying arm carried by said bar, means for keeping the roller in contact with the wheel-tire, means for disengaging the roller from the tire, and intermediate connections between the roller and the bell for sounding an alarm during the motion of the wheel and during the contact between the roller and the tire of the wheel, substantially as set forth.

5. In a bicycle alarm-bell, a suitable bell adapted to be carried by the machine, a roller-carrying arm in proximity to the bell, a spring-controlled lever for normally effecting contact between the roller and tire of the wheel, a cord having one end secured to the free end of the lever, a roller carried by the handle-bar over which said cord passes, and a controlling-arm pivoted adjacent to one of the handles of the handle-bar to which the opposite end of the cord is attached, whereby the rider upon the swinging of the arm draws the cord against the resiliency of the spring controlling the lever, disengages the roller from the tire, substantially as set forth.

In testimony whereof we affix our signatures in presence of two witnesses.

PAUL FLUCKS.
GEORGE P. McDONNELL.

Witnesses:
ALFRED A. MATHEY,
EMIL STAREK.